United States Patent [19]

Klatte

[11] Patent Number: 5,314,852
[45] Date of Patent: May 24, 1994

US005314852A

[54] CHEMICALLY IMPREGNATED ZEOLITE AND METHOD FOR CHEMICALLY IMPREGNATING AND COATING ZEOLITE

[76] Inventor: Fred Klatte, Two Spruce St., San Francisco, Calif. 94118

[21] Appl. No.: 750

[22] Filed: Jan. 5, 1993

Related U.S. Application Data

[63] Continuation-in-part of Ser. No. 975,680, Nov. 13, 1992, Pat. No. 5,278,112.

[51] Int. Cl.$^5$ .................. B01J 20/18; B01J 29/06; A23K 1/16; A23K 1/22
[52] U.S. Cl. .......................... 502/60; 502/62; 426/72; 426/635; 426/807
[58] Field of Search ............. 502/62, 60; 426/72, 426/73, 271, 635, 807

[56] References Cited

U.S. PATENT DOCUMENTS

| | | | |
|---|---|---|---|
| 2,885,368 | 5/1959 | Hess et al. | 502/60 |
| 3,049,399 | 8/1962 | Gamson et al. | 21/53 |
| 3,298,780 | 1/1967 | Fleck | 502/60 |
| 4,554,261 | 11/1985 | Gergely et al. | 502/62 |
| 4,610,882 | 9/1986 | Laurent et al. | 426/72 |
| 4,871,701 | 10/1989 | Danner et al. | 502/62 |
| 5,264,227 | 11/1993 | LaRoche et al. | 426/72 |

OTHER PUBLICATIONS

Material Safety Data Sheet (5 pages), Chemax, Inc. (Jan. 30, 1992).
Cadena, et al., *Treatment of Waters Contaminated with BTX and Heavy Metals Using Tailored Zeolites*, Feb. 1992, New Mexico Waste-Management Education and Research Consortium, Technical Completion Report (Project No. WERC-91-41), 22 pages.
Gao et al, *use of Tailored Zeolites for Removal of Benzene and Toluene from Water*, 45th Purdue Industrial Waste Conference Proceedings, pp. 509-515, Lewis Publishers, Inc. Chelsea, Mich., 1991.
Brochure entitled "Carusorb® 200, " by Carus (1 page).

*Primary Examiner*—Carl F. Dees
*Attorney, Agent, or Firm*—Limbach & Limbach

[57] ABSTRACT

A process for impregnating zeolite with a substance such as potassium hydroxide (KOH), and a product of such process. The process preferably includes the steps of dehydrating zeolite crystals, then immersing the dehydrated zeolite crystals in (or spraying the dehydrated crystals with) aqueous KOH and thoroughly mixing the resulting slurry, and finally air drying the mixed slurry to produce KOH—impregnated zeolite crystals. The zeolite crystals (after they are dried) are uniformly impregnated with a concentration of KOH in the range from about 5% to about 15% of the total product weight. In other embodiments, the inventive method includes the step of impregnating zeolite crystals with metal sulfates or soluble salts (such as Fe2S04, FeCl3, CuSO4, CuCl2, ZnSO4, ZnCl2, CoSO4, CoCl, MnSO4, MnCl, sodium selenate, or MgSO4), or other substances such as amino acids (e.g., methionine or lysine), urea, free amines, or vitamins (such as A, D, E, K, Biotin, Choline, Niacin, Riboflavin, and Pantothenic acid). In each embodiment, the presence of a quaternary ammonium cation coating on the impregnated zeolite allows regulated time release control of the impregnating substance, and thus permits a controlled release diffusion (or absorption) rate in air filtration, animal feed, and other applications. The characteristics of the QAC coating on the impregnated zeolite can be varied to control the reaction rate of the impregnating substance.

56 Claims, 1 Drawing Sheet

CHEMICALLY IMPREGNATED ZEOLITE AND METHOD FOR CHEMICALLY IMPREGNATING AND COATING ZEOLITE

CROSS-REFERENCE TO RELATED APPLICATION

The present application is a continuation-in-part of pending U.S. patent application Ser. No. 07/975,680, filed Nov. 13, 1992, now U.S. Pat. No. 5,278,112.

FIELD OF THE INVENTION

The invention relates to processes for producing chemically impregnated zeolite and coated, chemically impregnated zeolite, and to the products of such processes. A preferred embodiment of the invention is a process for chemically impregnating zeolite crystals with potassium hydroxide, and then coating the impregnated zeolite crystals with a quaternary ammonium cation.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to several millimeters) have been employed in water and air (or other gas) filtration systems to selectively absorb contaminants from a flowing stream of water or gas.

It has been proposed to treat zeolite crystals by impregnating them with quaternary ammonium cations (such as tetramethylammonium, tetraethylammonium, hexadecyltrimethylammonium, dibenzyldimethylammonium, benzyltriethylammonium, and cetyltrimethylammonium), to enhance the zeolite's capacity to absorb heavy metal, benzene, toluene, and xylene contaminants from water. See, for example, Cadena, et al., "Treatment of Waters Contaminated with BTX and Heavy Metals Using Tailored Zeolites," New Mexico Waste-management Education and Research Consortium Technical Completion Report for Project No. WERC-91-41 (Feb. 1992). If not impregnated with a quaternary ammonium cation (QAC), zeolite does not function adequately as a molecular sieve for organic chemicals such as benzene, toluene, and xylene.

It has also been proposed to impregnate an aqueous solution of permanganate (such as permanganate of potassium, sodium, magnesium, calcium, barium, or lithium) into pores of substrates such as silica gel, alumina, silica-alumina, activated bauxite, and activated clay. The resulting impregnated porous substrates have been employed for filtering and deodorizing air. See, for example, U.S. Pat. No. 3,049,399, issued Aug. 14, 1962, to Gamson, et al.

However, zeolite crystals have not been impregnated (throughout their volume) with permanganate.

Further, those skilled in the art have avoided exposing quaternary ammonium cations or salts to oxidizing agents, and especially to strong oxidizing agents such as permanganates (to avoid violent reactions of the type predicted in the literature).

The inventor has found that zeolite crystals can readily be impregnated with a usefully high concentration of potassium hydroxide, and that, under certain conditions, such impregnated zeolite reacts too rapidly to be practically useful for some air filtration applications.

For air (and other gas) filtration, water filtration, and animal feed applications, it would be desirable to reduce the rate at which potassium hydroxide-impregnated zeolite absorbs selected contaminants, and to control such absorption rate. Similarly, for animal feed applications, it would be desirable to impregnate zeolite with metal compounds, amino acids, vitamins, and other substances, and to reduce the release rate of the impregnating substance from the zeolite. However, until the present invention, it was not known how to achieve these objectives.

SUMMARY OF THE INVENTION

In one class of embodiments, the invention is a process for impregnating zeolite crystals with potassium hydroxide (KOH). The product of such process is an embodiment of the invention. A preferred embodiment of the inventive process results in zeolite crystals uniformly impregnated with potassium hydroxide (with potassium hydroxide content in the range from about 5% to about 15% by weight). This embodiment includes the steps of dehydrating the zeolite crystals until they have moisture content substantially below their initial moisture content (and preferably until they have a moisture content of about 5%), then immersing the dehydrated zeolite crystals in (or spraying the dehydrated crystals with) aqueous potassium hydroxide (having a potassium hydroxide concentration of about 39% by weight) at 190° F. and thoroughly mixing the resulting slurry, and finally air drying the mixed slurry to produce KOH-impregnated zeolite crystals. The zeolite crystals (after they are dried) are uniformly impregnated with a concentration of potassium hydroxide in the range from about 5% to about 15% of the total product weight.

In other preferred embodiments, the method of the invention includes the steps of impregnating zeolite crystals with potassium hydroxide (preferably by immersing them in aqueous potassium hydroxide) and coating the impregnated zeolite with a quaternary ammonium cation (QAC).

In other preferred embodiments, the method of the invention includes the step of impregnating zeolite crystals with metal sulfates or soluble salts (such as $FeSO_4$, $FeCl_3$, $CuSO_4$, $CuCl_2$, $ZnSO_4$, $ZnCl_2$, $CoSO_4$, $CoCl$, $MnSO_4$, $MnCl$, sodium selenate, or $MgSO_4$), or other substances such as amino acids (e.g., methionine or lysine), urea, free amines, or vitamins (such as A, D, E, K, Biotin, Choline, Niacin, Riboflavin, and Pantothenic acid). Preferably, the impregnating vitamins are water soluble vitamins, but fat soluble vitamins can also be employed. Preferably, the impregnation step is performed by immersing the zeolite in (or spraying the zeolite with) aqueous sodium selenate, aqueous urea, an aqueous amino acid, an aqueous free amine, an aqueous vitamin, an aqueous metal sulfate, or an aqueous salt of iron, copper, zinc, cobalt, manganese or magnesium. Preferably, the impregnated zeolite is coated with a QAC.

In each embodiment, the presence of the QAC coating allows regulated time release control of the impregnating substance, and thus permits a controlled release diffusion (or absorption) rate in applications in which the coated, impregnated zeolite is employed to absorb contaminants from a fluid such as air or water.

An important aspect of the invention is that the characteristics of the QAC coating on the impregnated zeolite crystal can be varied to control the reaction rate of the impregnating substance within the zeolite. Such characteristics can be varied by changing the concentration of the coating solution employed to coat the impregnated zeolite crystal.

The coated, impregnated zeolite resulting from all embodiments of the inventive method, or a mixture of the coated, impregnated zeolite resulting from two or more embodiments, or a mixture of uncoated, impregnated zeolite and coated, impregnated zeolite resulting from any embodiment of the inventive method, can be used for a variety of molecular sieving applications, such as for animal feed, or filtration of contaminants from fluid (such as air or water). The number of combinations of coated and uncoated crystals can match specific environmental circumstances which can be calculated by analysis of the air or water to be treated. Mixtures of coated and uncoated KOH-impregnated zeolite can be used to react with hydrogen sulfide, acetone, ethylene glycols, formaldehyde, and other contaminants.

DETAILED DESCRIPTION OF THE PREFERRED EMBODIMENTS

Figure 1:
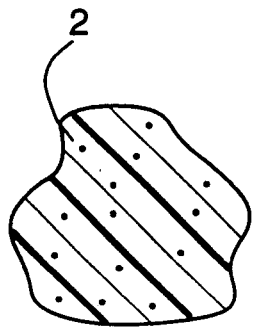
FIG. 1 is a cross-sectional view of a zeolite crystal impregnated with potassium hydroxide.

In one class of embodiments, the invention is a process for impregnating zeolite crystals (for example, crystals having size 0.125 inch×0.10 inch, 0.25 inch×0.125 inch, 0.125 inch×0.50 inch, or 0.50 inch×0.75 inch) with potassium hydroxide, and the product of such process. A preferred embodiment of such process, for producing zeolite crystals uniformly impregnated with potassium hydroxide, includes the steps of: dehydrating the zeolite crystals until they have moisture content substantially below their initial moisture content (and preferably until their moisture content is about 5%), then immersing the dehydrated zeolite crystals in (or spraying the dehydrated crystals with) aqueous potassium hydroxide (having a potassium hydroxide concentration of about 39% by weight) at 190° F. and thoroughly mixing the resulting slurry, and finally air drying the mixed slurry to produce potassium hydroxide-impregnated ("KOH-impregnated") zeolite crystals. The zeolite crystals (after they are dried) are uniformly impregnated with a concentration of potassium hydroxide in the range from about 5% to about 15% of the final product of the process. FIG. 1 shows one such impregnated zeolite crystal whose channels have been impregnated with potassium hydroxide 2.

The inventor's experiments have demonstrated that unimpregnated zeolite has a pH of 6.1, that zeolite impregnated with 5% potassium hydroxide (in accordance with the invention) has a pH of 10.6, and that zeolite impregnated with 10% potassium hydroxide (in accordance with the invention) has a pH of 11.5.

The inventive KOH-impregnated zeolite is useful for a variety of applications such as air filtration and animal feed. For example, KOH-impregnated zeolite absorbs, adsorbs, or reacts with certain air contaminants. For another example, when KOH-impregnated zeolite is fed to ruminant animals (such as cows), it provides buffering (antacid activity) in several digestive organs, including the rumen and small intestine (although KOH is much too caustic to feed alone to such animals). However, for uncoated KOH-impregnated zeolite, the rate of absorption of air contaminants, and the activity rate, may be too high or too low for some air filtration and animal feed applications.

The rate at which KOH-impregnated zeolite absorbs (or reacts with, or both absorbs and reacts with) selected air contaminants or ruminant digestive tract chemicals can be controlled (reduced or increased to a desired level) by applying a quaternary ammonium cation (QAC) coating to the impregnated zeolite. The advantages of the inventive QAC-coated, KOH-impregnated zeolite (over conventional air filtration chemicals) include lower manufacturing cost (including lower drying cost) and a reduced level of dusting during processing and handling, as well as improved contaminant absorption characteristics.

Figure 2:
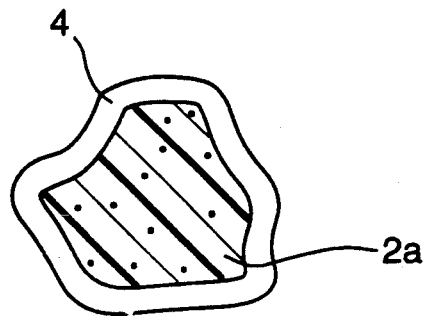
FIG. 2 is a cross-sectional view of the impregnated zeolite crystal of FIG. 1, after it has been coated with a QAC in accordance with the invention.

In a first class of preferred embodiments, the inventive method includes the steps of impregnating zeolite with potassium hydroxide and then coating the KOH-impregnated zeolite with a QAC (preferably, cetyltrimethylammonium, although other QACs are suitable for certain applications). FIG. 2 shows one such KOH-impregnated crystal, whose channels contain QAC 4 in the region near the crystal's surface, and whose channels are impregnated with potassium hydroxide $2a$ throughout the volume of the crystal inside the surface region containing QAC 4.

The QAC coating operation is preferably accomplished by immersing KOH-impregnated zeolite in (or spraying KOH-impregnated zeolite with) liquid cetyltrimethylammonium chloride (with a weight ratio Q/T in the range from 0.1% to 5%, where Q is the cetyltrimethylammonium chloride weight and T is the total weight of the final product of the process). As a result of such immersion (or spraying), a QAC coating is applied to each KOH-impregnated zeolite crystal in the sense that the QAC (cetyltrimethylammonium) enters the channels near each crystal's outer surface but the QAC does not penetrate far into the interior of each crystal. From a practical point of view, the inventor has found that the weight ratio of liquid cetyltrimethylammonium chloride employed for coating KOH-impregnated zeolite crystals should preferably (at least for many air filtration applications) satisfy the following relation: $0.1\% < Q/T < 0.5\%$, where Q is the cetyltrimethylammonium chloride weight and T is the total weight of the final product of the process.

The activity rate of QAC-coated, KOH-impregnated zeolite depends on the concentration of the QAC solution with which the KOH-impregnated zeolite is coated. Increasing the QAC concentration will decrease the activity rate. The inventor has found that the leaching rate of KOH from within QAC-coated, KOH-impregnated zeolite (and hence the expected activity rate) is negligible if the weight ratio of the QAC coating is in the range from 1% to 2% (i.e., if the weight of liquid cetyltrimethylammonium chloride employed for coating KOH-impregnated zeolite crystals satisfies the relation $1\% < Q/T < 2\%$, where Q is the cetyltrimethylammonium chloride weight and T is the total weight of the final product of the process). To produce QAC-coated, KOH-impregnated zeolite for most air filtration applications, the optimum QAC coating weight ratio is in the range from 0.1% to 0.5% (i.e., the weight of liquid cetyltrimethylammonium chloride employed for coating the hydroxide-impregnated zeolite crystals satisfies the relation $0.1\% < Q/T < 0.5\%$, where Q is the cetyltrimethylammonium chloride weight and T is the total weight of the final product of the process). However, for KOH-impregnated zeolite crystals with a very high KOH concentration, it may be desirable to employ a greater amount of QAC for the coating (i.e., the weight of liquid cetyltrimethylammonium chloride employed for the coating should satisfy the relation $0.5\% < Q/T$, where Q is the cetyltrimethylammonium chloride weight and T is the total weight of the final product of the process).

An optimal KOH-impregnated zeolite product for absorbing (and/or reacting with) any of a wide variety of contaminants (or contaminant groups) from a fluid, or for producing desired buffering activity as an animal feed, can be determined experimentally in the following manner. Uncoated, KOH-impregnated zeolite crystals (preferably produced in the manner described below) are mixed in various ratios with QAC-coated, KOH-impregnated zeolite crystals, and the contaminant absorption and/or reaction characteristics of each mixture studied. The mixture producing the best absorption and/or reaction characteristics is identified as the optimal mixture.

In other preferred embodiments, the inventive method includes the step of impregnating zeolite crystals with substances useful for animal feed applications. Examples of such substances include metal sulfates and soluble salts (such as Fe2SO4, FeCl3, CuSO4, CuCl2, ZnSO4, ZnCl2, CoSO4, CoCl, MnSO4, MnCl, sodium selenate, or MgSO4), and other substances such as amino acids (e.g., methionine or lysine), urea, free amines, and vitamins (such as A, D, E, K, Biotin, Choline, Niacin, Riboflavin, and Pantothenic acid). Preferably, the impregnating vitamins are water soluble vitamins, but fat soluble vitamins can also be employed. Preferably, the impregnation step is performed by immersing the zeolite in (or spraying the zeolite with) aqueous sodium selenate, aqueous urea, an aqueous amino acid, an aqueous free amine, an aqueous vitamin, an aqueous metal sulfate, or an aqueous salt of iron, copper, zinc, cobalt, manganese or magnesium.

Figure 3:
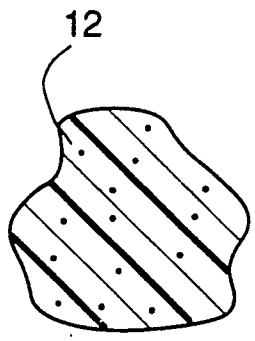
FIG. 3 is a cross-sectional view of a zeolite crystal impregnated with a substance selected from the set of metal surfates, soluble salts, amino acids, urea, free amines, and vitamins.

In these embodiments, the inventive method preferably includes the steps of: dehydrating the zeolite crystals until they have moisture content substantially below their initial moisture content (preferably until their moisture content is about 5%), then immersing the dehydrated zeolite crystals in (or spraying the dehydrated crystals with) an aqueous solution of the impregnating substance at high temperature (e.g., 190° F.) and thoroughly mixing the resulting slurry, and finally air drying the mixed slurry to produce impregnated zeolite crystals. FIG. 3 is a cross-sectional view of one of the resulting zeolite crystals, whose channels have been impregnated with a substance 12 (other than potassium hydroxide).

The impregnated zeolite can be employed as an animal feed supplement, particularly for ruminant animals (such as cows). However, the activity rate of the uncoated, impregnated zeolite may be too high or too low for some animal feed applications. The rate at which the impregnated zeolite releases the impregnating substance to an animal's digestive tract chemicals can be controlled (reduced or increased to a desired level) by applying a quaternary ammonium cation (QAC) coating to the impregnated zeolite.

Figure 4:
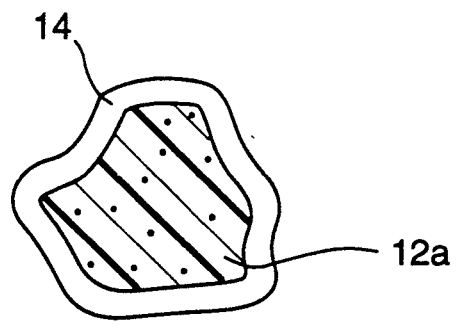
FIG. 4 is a cross-sectional view of the impregnated zeolite crystal of FIG. 3, after it has been coated with a QAC in accordance with the invention.

It is within the scope of the invention to impregnate zeolite with a substance (such as any of those listed above) potassium hydroxide and then coat the impregnated zeolite with a QAC (Preferably, cetyltrimethylammonium, although other QACs are suitable for certain applications). FIG. 4 is a cross-sectional view of one such impregnated crystal, whose channels contain QAC 14 in the region near the crystal's surface, and whose channels are impregnated with a substance 12a (other than potassium hydroxide) throughout the volume of the crystal inside the surface region containing QAC 14.

The QAC coating operation is preferably accomplished by immersing impregnated zeolite in (or spraying impregnated zeolite with) liquid cetyltrimethylammonium chloride (with a weight ratio Q/T in the range from 0.1% to 5%, where Q is the cetyltrimethylammonium chloride weight and T is the total weight of the final product of the process). As a result of such immersion (or spraying), a QAC coating is applied to each impregnated zeolite crystal in the sense that the QAC (cetyltrimethylammonium) enters the channels near each crystal's outer surface but the QAC does not penetrate far into the interior of each crystal. From a practical point of view, the inventor has found that the weight ratio of liquid cetyltrimethylammonium chloride employed for coating KOH-impregnated zeolite crystals should preferably (at least for many applications) satisfy the following relation: $0.1\% < Q/T < 0.5\%$, where Q is the cetyltrimethylammonium chloride weight and T is the total weight of the final produce of the process.

The activity rate of QAC-coated, impregnated zeolite depends on the concentration of the QAC solution with which the impregnated zeolite is coated. Increasing the QAC concentration will decrease the activity rate.

Although the QAC in preferred embodiments of the invention is cetyltrimethylammonium, other QACs can be substituted for cetyltrimethylammonium in alternative embodiments.

It may be useful to mix the inventive QAC-coated, KOH-impregnated zeolite crystals with other embodiments of the inventive QAC-coated, impregnated zeolite crystals.

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A method for impregnating zeolite crystals, including the steps of:

1. (a) dehydrating the zeolite crystals to decrease their moisture content below their initial moisture content;
(b) after step (a), adding to the zeolite crystals an aqueous solution of one or more water soluble vitamins;
(c) after step (b), air drying the zeolite crystals to produce impregnated zeolite crystals.

2. A method for impregnating zeolite crystals, including the steps of:
(a) dehydrating the zeolite crystals to decrease their moisture content below their initial moisture content;
(b) after step (a), adding aqueous potassium hydroxide to the zeolite crystals;
(c) after step (b), air drying the zeolite crystals to produce potassium hydroxide-impregnated zeolite crystals.

3. A potassium hydroxide-impregnated zeolite crystal produced by performing the method of claim 2.

4. The method of claim 1, wherein step (b) is performed at a temperature substantially equal to 190° F.

5. The method of claim 1, wherein step (a) includes the step of dehydrating the zeolite crystals until they have a moisture content substantially equal to 5%.

6. An impregnated zeolite crystal produced by performing the method of claim 1.

7. The method of claim 1, wherein each of said vitamins is a vitamin selected from the group consisting of niacin, riboflavin, and pantothenic acid.

8. The method of claim 1, also including the steps of:
(d) after step (c), coating the impregnated zeolite crystals with a quaternary ammonium cation.

9. The method of claim 8, wherein the quaternary ammonium cation is cetyltrimethylammonium.

10. A coated, impregnated zeolite crystal produced by performing the method of claim 8.

11. The method of claim 8, wherein step (d) consists of immersing the impregnated zeolite crystals in a liquid quaternary ammonium cation.

12. The method of claim 8, wherein step (d) consists of spraying the impregnated zeolite crystals with a liquid quaternary ammonium cation.

13. A method for producing a treated zeolite product, including the steps of:
(a) producing impregnated zeolite crystals by impregnating zeolite crystals with an aqueous solution of one or more water soluble vitamins; and
(b) after step (a), producing coated, impregnated zeolite crystals by coating the impregnated zeolite crystals with a quaternary ammonium cation.

14. A treated zeolite product produced by performing the method of claim 13.

15. A method for producing a treated zeolite product, including the steps of:
(a) producing impregnated zeolite crystals by impregnating zeolite crystals with potassium hydroxide; and
(b) after step (a), producing coated, impregnated zeolite crystals by coating the impregnated zeolite crystals with a quaternary ammonium cation.

16. The method of claim 2, wherein step (a) includes the step of dehydrating the zeolite crystals until they have a moisture content substantial equal to 5%.

17. A method for impregnating zeolite crystals, including the step of:
(a) dehydrating the zeolite crystals to decrease their moisture content below their initial moisture content;
(b) after step (a), adding to the zeolite crystals an emulsion of one or more fat soluble vitamins;
(c) after step (b), air drying the zeolite crystals to produce impregnated zeolite crystals.

18. An impregnated zeolite crystal produced by performing the method of claim 17.

19. The method of claim 17, wherein step (a) includes the step of dehydrating the zeolite crystals until they have a moisture content substantially equal to 5%.

20. The method of claim 17, also including the step of:
(d) after step (c), coating the impregnated zeolite crystals with a quaternary ammonium cation.

21. The method of claim 20, wherein the quaternary ammonium cation is cetyltrimethylammonium.

22. A coated, impregnated zeolite crystal produced by performing the method of claim 21.

23. The method of claim 17, wherein each of said vitamins is a vitamin selected from the group consisting of vitamin A, vitamin D, vitamin E, vitamin K, biotin, and chlorine.

24. A method for impregnating zeolite crystals, including the steps of:
(a) dehydrating the zeolite crystals to decrease their moisture content below their initial moisture content;
(b) after step (a), adding to the zeolite crystals an aqueous solution of one or more metal surfaces;
(c) after step (b), air drying the zeolite crystals to produce impregnated zeolite crystals.

25. The method of claim 24, wherein each of the metal sulfates is selected from the group consisting of $Fe_2SO_4$, $CuSO_4$, $ZnSO_4$, $CoSO_4$, $MnSO_4$, and $MgSO_4$.

26. An impregnated zeolite crystal produced by performing the method of claim 24.

27. The method of claim 24, wherein step (a) includes the step of dehydrating the zeolite crystals until they have a moisture content substantially equal to 5%.

28. The method of claim 24, also including the step of:
(d) after step (c), coating the impregnated zeolite crystals with a quaternary ammonium cation.

29. A coated, impregnated zeolite crystal produced by performing the method of claim 28.

30. A method for impregnating zeolite crystals including the steps of:
(a) dehydrating the zeolite crystals to decrease their moisture content below their initial moisture content;
(b) after step (a), adding to the zeolite crystals an aqueous solution of one or more salts of iron, copper, zinc, cobalt, manganese or magnesium;
(c) after step (b), air drying the zeolite crystals to produce impregnated zeolite crystals.

31. The method of claim 30, wherein each of the salts is selected from the group consisting of $FeCl_3$, $CuCl_2$, $ZnCl_2$, $CoCl$, and $MnCl$.

32. An impregnated zeolite crystal produced by performing the method of claim 30.

33. The method of claim 30 wherein step (a) includes the step of dehydrating the zeolite crystals until they have a moisture content substantially equal to 5%.

34. The method of claim 30, also including the step of:
(d) after step (c), coating the impregnated zeolite crystals with a quaternary ammonium cation.

35. A coated, impregnated zeolite crystal produced by performing the method of claim 34.

36. A method for impregnating zeolite crystals, including the steps of:
   (a) dehydrating the zeolite crystals to decrease their moisture content below their initial moisture content;
   (b) after step (a), adding to the zeolite crystals an aqueous solution of sodium selenate;
   (c) after step (b), air drying the zeolite crystals to produce impregnated zeolite crystals.

37. An impregnated zeolite crystal produced by performing the method of claim 34.

38. The method of claim 36, wherein step (a) includes the step of dehydrating the zeolite crystals until they have a moisture content substantially equal to 5%.

39. The method of claim 36, also including the step of:
   (d) after step (c), coating the impregnated zeolite crystals with a quaternary ammonium cation.

40. A coated, impregnated zeolite crystal produced by performing the method of claim 39.

41. A method for impregnating zeolite crystals, including the steps of:
   (a) dehydrating the zeolite crystals to decrease their moisture content below their initial moisture content;
   (b) after step (a), adding to the zeolite crystals an aqueous solution of one or more amino acids;
   (c) after step (b), air drying the zeolite crystals to produce impregnated zeolite crystals.

42. The method of claim 41, wherein each of the amino acids is selected from the group consisting of methionine and lysine.

43. An impregnated zeolite crystal produced by performing the method of claim 41.

44. The method of claim 41, wherein step (a) includes the step of dehydrating the zeolite crystals until they have a moisture content substantially equal to 5%.

45. The method of claim 41, also including the step of:
   (d) after step (c), coating the impregnated zeolite crystals with a quaternary ammonium cation.

46. A coated, impregnated zeolite crystal produced by performing the method of claim 45.

47. A method for impregnating zeolite crystals, including the steps of:
   (a) dehydrating the zeolite crystals to decrease their moisture content below their initial moisture content;
   (b) after step (a), adding aqueous urea to the zeolite crystals;
   (c) after step (b), air drying the zeolite crystals to produce impregnated zeolite crystals.

48. An impregnated zeolite crystal produced by performing the method of claim 42.

49. The method of claim 53, wherein step (a) includes the step of dehydrating the zeolite crystals until they have a moisture content substantially equal to 5%.

50. The method of claim 47, also including the step of:
   (d) after step (c), coating the impregnated zeolite crystals with a quaternary ammonium cation.

51. A coated, impregnated zeolite crystal produced by performing the method of claim 50.

52. A method for impregnating zeolite crystals, including the steps of:
   (a) dehydrating the zeolite crystals to decrease their moisture content below their initial moisture content;
   (b) after step (a), adding to the zeolite crystals an aqueous solution of one or more free amines;
   (c) after step (b), air drying the zeolite crystals to produce impregnated zeolite crystals.

53. An impregnated zeolite crystal produced by performing the method of claim 52.

54. The method of claim 52, wherein step (a) includes the step of dehydrating the zeolite crystals until they have a moisture content substantially equal to 5%.

55. The method of claim 52, also including the step of:
   (d) after step (c), coating the impregnated zeolite crystals with a quaternary ammonium cation.

56. A coated impregnated zeolite crystal produced by performing the method of claim 55.

* * * * *

UNITED STATES PATENT AND TRADEMARK OFFICE
CERTIFICATE OF CORRECTION

PATENT NO. : 5,314,852
DATED : May 24, 1994
INVENTOR(S) : Fred Klatte

It is certified that error appears in the above-indentified patent and that said Letters Patent is hereby corrected as shown below:

Column 8, line 24, change "chlorine" to --choline--;
Column 8, line 30, change "surfaces" to --sulfates--.

Signed and Sealed this

Thirtieth Day of August, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,314,852
DATED : May 24, 1994
INVENTOR(S) : Fred Klatte

It is certified that error appears in the above-indentified patent and that said Letters Patent is hereby corrected as shown below:

In col. 2, line 50, change "Fe2SO4" to --$FeSO_4$--;
In col. 2, line 51, change "FeCl3" to --$FeCl_2$--;
In col. 5, line 43, change "Fe2SO4" to --$FeSO_4$--;
In col. 5, line 43, change "FeCl3" to --$FeCl_2$--;
In col. 8, line 36, change "Fe2SO4" to --$FeSO_4$--;
In col. 8, line 59, change "FeCl3" to --$FeCl_2$--;

In the Abstract:

In line 14, change "Fe2SO4" to --$FeSO_4$-- and "FeCl3" to --$FeCl_2$--.

This certificate supersedes Certificate of Correction issued July 16, 1996.

Signed and Sealed this

Twenty-second Day of October, 1996

Attest:

BRUCE LEHMAN

*Attesting Officer*     *Commissioner of Patents and Trademarks*